US006811856B2

(12) United States Patent
Nun et al.

(10) Patent No.: US 6,811,856 B2
(45) Date of Patent: Nov. 2, 2004

(54) PROPERTIES OF STRUCTURE-FORMERS FOR SELF-CLEANING SURFACES, AND THE PRODUCTION OF THE SAME

(75) Inventors: Edwin Nun, Billerbeck (DE); Markus Oles, Hattingen (DE); Bernhard Schleich, Recklinghausen (DE)

(73) Assignee: Creavis Gesellschaft fuer Technologie und Innovation mbH, Marl (DE)

(*) Notice: Subject to any disclaimer, the term of this patent is extended or adjusted under 35 U.S.C. 154(b) by 126 days.

(21) Appl. No.: 10/120,366

(22) Filed: Apr. 12, 2002

(65) Prior Publication Data

US 2002/0150726 A1 Oct. 17, 2002

(30) Foreign Application Priority Data

Apr. 12, 2001 (DE) ........................................ 101 18 345

(51) Int. Cl.[7] .............................. B32B 5/16; B05D 1/12

(52) U.S. Cl. ....................... 428/143; 428/144; 428/145; 428/147; 428/148; 428/149; 428/220; 428/323; 428/327; 428/328; 428/331; 428/332; 427/199; 427/204; 427/180

(58) Field of Search ................................ 428/143, 144, 428/145, 147, 148, 149, 220, 323, 327, 328, 331, 332; 427/199, 204, 180

(56) References Cited

U.S. PATENT DOCUMENTS

| | | | | | |
|---|---|---|---|---|---|
| 3,354,022 | A | | 11/1967 | Dettre et al. | |
| 5,141,915 | A | * | 8/1992 | Roenigk et al. | 503/227 |
| 5,432,000 | A | * | 7/1995 | Young et al. | 428/372 |
| 5,599,489 | A | | 2/1997 | Saiki et al. | |
| 2001/0037876 | A1 | * | 11/2001 | Oost et al. | 165/133 |
| 2002/0016433 | A1 | * | 2/2002 | Keller et al. | 528/10 |
| 2002/0045010 | A1 | * | 4/2002 | Rohrbaugh et al. | 427/372.2 |
| 2002/0150724 | A1 | * | 10/2002 | Nun et al. | 428/143 |
| 2002/0150725 | A1 | * | 10/2002 | Nun et al. | 428/143 |
| 2002/0150726 | A1 | * | 10/2002 | Nun et al. | 428/143 |
| 2003/0114571 | A1 | * | 6/2003 | Pan | 524/492 |

FOREIGN PATENT DOCUMENTS

| | | |
|---|---|---|
| DE | 199 17 367 | 10/2000 |
| EP | 1 040 874 | 10/2000 |
| WO | WO 96/04123 | 2/1996 |
| WO | WO 00/39239 | 7/2000 |
| WO | WO 00/58410 | 10/2000 |

OTHER PUBLICATIONS

Patent Abstracts of Japan, JP 11–171592, Jun. 29, 1999.

* cited by examiner

*Primary Examiner*—William P. Watkins, III
(74) *Attorney, Agent, or Firm*—Oblon, Spivak, McClelland, Maier & Neustadt, P.C.

(57) ABSTRACT

A self-cleaning surface which has an artificial, at least partially hydrophobic, surface structure made from elevations and depressions, where the elevations and depressions are formed by particles secured to the surface, wherein the particles have a fissured structure with elevations and/or depressions in the nanometer range; a process for making such a surface; and particles having a fissured structure with elevations and/or depressions in the nanometer range.

19 Claims, 2 Drawing Sheets

PROPERTIES OF STRUCTURE-FORMERS FOR SELF-CLEANING SURFACES, AND THE PRODUCTION OF THE SAME

BACKGROUND OF THE INVENTION

1. Field of the Invention

The present invention relates to structured particles and to the use of the same for self-cleaning surfaces, and to a process for production of such surfaces.

2. Discussion of the Background

Objects with surfaces which are extremely difficult to wet have a number of commercially significant features. The feature of most commercial significance here is the self-cleaning action of low-wettability surfaces, since the cleaning of surfaces is time-consuming and expensive. Self-cleaning surfaces are therefore of very great commercial interest. The mechanisms of adhesion are generally the result of surface-energy-related parameters acting between the two surfaces which are in contact. These systems generally attempt to reduce their free surface energy. If the free surface energies between two components are intrinsically very low, it can generally be assumed that there will be weak adhesion between these two components. The important factor here is the relative reduction in free surface energy. In pairings where one surface energy is high and one surface energy is low the crucial factor is very often the opportunity for interactive effects, for example, when water is applied to a hydrophobic surface it is impossible to bring about any noticeable reduction in surface energy. This is evident in that the wetting is poor. The water applied forms droplets with a very high contact angle. Perfluorinated hydrocarbons, e.g. polytetrafluoroethylene, have very low surface energy. There are hardly any components which adhere to surfaces of this type, and components deposited on surfaces of this type are in turn very easy to remove.

The use of hydrophobic materials, such as perfluorinated polymers, for producing hydrophobic surfaces is known. A further development of these surfaces consists in structuring the surfaces in the μm to nm range. U.S. Pat. No. 5,599,489 discloses a process in which a surface can be rendered particularly repellent by bombardment with particles of an appropriate size, followed by perfluorination. Another process is described by H. Saito et al. in "Surface Coatings International" 4, 1997, pp. 168 et seq. Here, particles made from fluoropolymers are applied to metal surfaces, whereupon a marked reduction was observed in the wettability of the resultant surfaces with respect to water, with a considerable reduction in tendency toward icing.

U.S. Pat. No. 3,354,022 and WO 96/04123 describe other processes for reducing the wettability of objects by topological alterations in the surfaces. Here, artificial elevations or depressions with a height of from about 5 to 1000 μm and with a separation of from about 5 to 500 μm are applied to materials which are hydrophobic or are hydrophobicized after the structuring process. Surfaces of this type lead to rapid droplet formation, and as the droplets roll off they absorb dirt particles and thus clean the surface.

This principle has been borrowed from the natural world. Small contact surfaces reduce Van der Waals interaction, which is responsible for adhesion to flat surfaces with low surface energy. For example, the leaves of the lotus plant have elevations made from a wax, and these elevations lower the contact area with water. WO 00/58410 describes the structures and claims the formation of the same by spray-application of hydrophobic alcohols, such as 10-nonacosanol, or of alkanediols, such as 5,10-nonacosanediol. A disadvantage here is that the self-cleaning surfaces lack stability, since the structure is removed by detergents.

Another method of producing easy-clean surfaces has been described in DE 199 17 367 A1. However, coatings based on fluorine-containing condensates are not self-cleaning. Although there is a reduction in the area of contact between water and the surface, this is insufficient.

EP 1 040 874 A2 describes the embossing of microstructures and claims the use of structures of this type in analysis (microfluidics). A disadvantage of these structures is their unsatisfactory mechanical stability.

An example of a description of self-repeating or self-similar structures of surfaces is that by Marie E. Turner in Advanced Materials, 2001, 13, No. 3, pp. 180 et seq.

JP 11171592 describes a water-repellent product and its production, the dirt-repellent surface being produced by applying a film to the surface to be treated, the film having fine particles made from metal oxide and having the hydrolyzate of a metal alkoxide or of a metal chelate. To harden this film the substrate to which the film has been applied has to be sintered at temperatures above 400° C. The process is therefore suitable only for substrates which are stable even at temperatures above 400° C.

SUMMARY OF THE INVENTION

It is an object of the present invention to provide surfaces which are particularly effectively self-cleaning, with structures in the nanometer range, i.e., from about 1 to about 1000 nm, and also a simple process for producing self-cleaning surfaces of this type.

Surprisingly, it has been found that self-cleaning surfaces can be obtained in a particularly simple manner if use is made of particles which have a nano-scale structure.

DETAILED DESCRIPTION OF THE INVENTION

Figure 1:
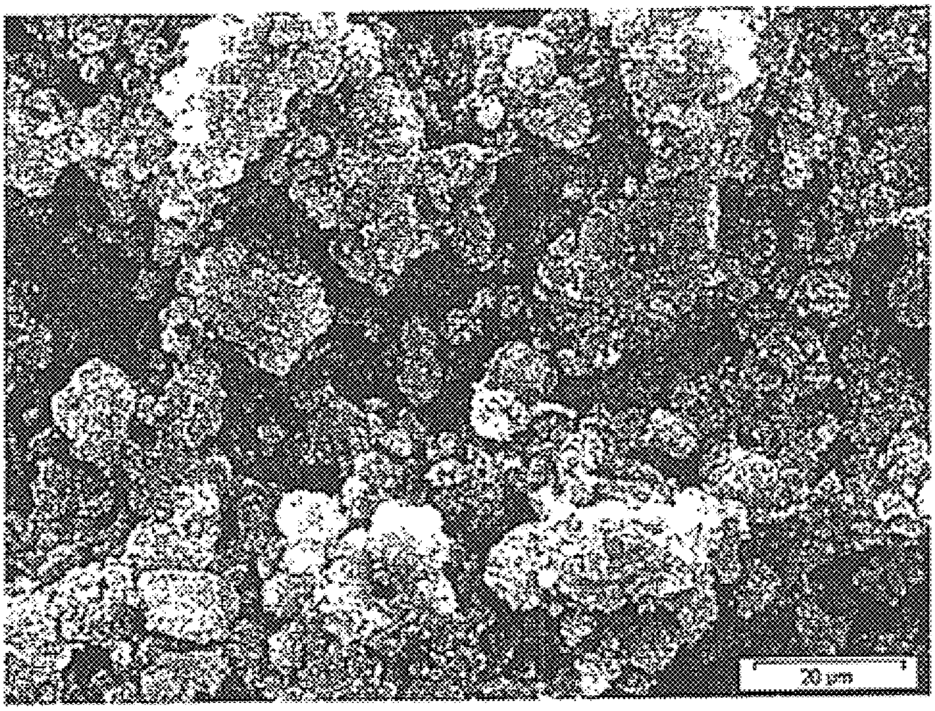
FIGS. 1 and 2 show scanning electron micrographs (SEMs) of particles used as structure-formers in the present invention.

The present invention therefore provides a self-cleaning surface which has an artificial, i.e., synthetic, at least partially hydrophobic, surface structure made from elevations and depressions, where the elevations and depressions are formed by particles secured to the surface, wherein the particles have a fissured structure with elevations and/or depressions in the nanometer range.

The present invention also provides a process for producing self-cleaning surfaces by creating a suitable, at least partially hydrophobic, surface structure by securing particles on a surface, which comprises using particles which have fissured structures with elevations and/or depressions in the nanometer range.

The process of the invention provides self-cleaning surfaces which have particles with a fissured structure. The use of particles which have a fissured structure gives access in a simple manner to surfaces which have structuring extending into the nanometer range. Unlike conventional processes which use particles of the smallest possible size to achieve the cleaning effect, the particles used in the process of the invention themselves have a structure in the nanometer range, making the particle size itself less critical, since the distance between the elevations is determined not only by the particle size but also by the nano-scale structure.

In the self-cleaning surface of the invention, which has an artificial, at least partially hydrophobic, surface structure made from elevations and depressions, the elevations and depressions being formed by particles secured to the surface, the particles have a fissured structure with elevations and/or depressions in the nanometer range. The elevations and/or depressions may span any and all sub-ranges within the broad range of from about 1 to about 1000 nm. The elevations and/or depressions preferably have an average height of from 20 to 500 nm, particularly preferably from 20 to 200 nm. The distance between the elevations and, respectively, depressions on the particles is preferably below 500 nm, very particularly preferably below 200 nm.

The fissured structures with elevations and/or depressions in the nanometer range may be formed by cavities, pores, grooves, peaks, and/or protrusions, for example. The particles themselves have an average size of less than 50 μm, preferably less than 30 μm, and very particularly preferably less than 20 μm. The distances between the particles on the surface are preferably from 0 to 10 particle diameters, in particular from 2 to 3 particle diameters.

Figure 3:
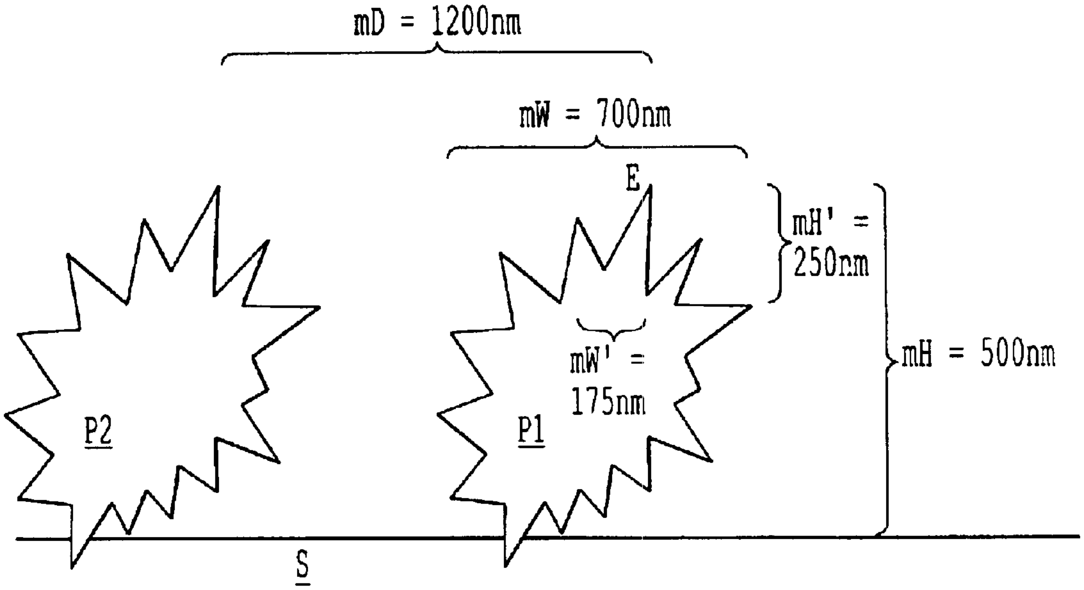
FIG. 3 is a two-dimensional schematic drawing of particles on a surface according to the present invention.

The fissured structures can also be characterized as craggy structures. An example of such a structure is demonstrated in FIG. 3. FIG. 3 is a two dimensional schematic figure of a structured surface S having fixed thereupon two particles P1 and P2, their approximate centers being spaced apart at a distance mD, such as 1200 nm. The particle P1 has an average size determined by a width mW, such as 700 nm and a height mH, such as 500 nm. Each of the particles has on its surface elevations E in the nanometer range, with a height mH', such as 250 nm, and a distance between elevations mW', such as 175 nm. The height and distance between depressions is analogous. Of course, a structure according to the invention will have many particles, of differing dimensions and shapes. Also, as seen from FIG. 3, there can be two kinds of elevations, the first ones prepared through the particles themselves and the second ones provided by the structured surfaces of the particles, if structured particles are used.

The particles may be particles in the sense of DIN 53 206. Particles in accordance with this standard may be individual particles or else aggregates or agglomerates, where according to DIN 53 206 aggregates are primary particles in edge- or surface-contact, while agglomerates are primary particles in point-contact. The particles used may also be those formed when primary particles combine to give agglomerates or aggregates. The structure of particles of this type may be spherical, strictly spherical, moderately aggregated, approximately spherical, extremely highly agglomerated, or porous-agglomerated. The preferred size of the agglomerates or aggregates is from 20 nm to 100 μm, particularly preferably from 0.2 to 30 μm.

The particles preferably have a BET surface area of from 20 to 1 000 square meters per gram. The particles very particularly preferably have a BET surface area of from 50 to 200 $m^2/g$.

The structure-forming particles used may be a very wide variety of compounds from a large number of fields of chemistry. The particles preferably comprise at least one material selected from the group consisting of silicates, doped silicates, minerals, metal oxides, silicas, polymers, and silica-coated metal powders. The particles very particularly preferably comprise fumed silicas or precipitated silicas, in particular Aerosils, $Al_2O_3$, $SiO_2$, $TiO_2$, $ZrO_2$, zinc powder coated with Aerosil R974, and preferably having a particle size of from 0.2 to 30 μm, or pulverulent polymers, e.g. cryogenically milled or spray-dried polytetrafluoroethylene (PTFE), or perfluorinated copolymers, or copolymers with tetrafluoroethylene.

The particles for generating the self-cleaning surfaces preferably have hydrophobic properties, besides the fissured structures. The particles may themselves be hydrophobic, e.g. particles comprising PTFE, or the particles used may have been hydrophobicized. The hydrophobicization of the particles may take place in a manner known to the skilled worker. Examples of typical hydrophobicized particles are very fine powders, such as Aerosil R8200 (Degussa A G), these materials being commercially available.

The silicas whose use is preferred preferably have a dibutyl phthalate adsorption, based on DIN 53 601, of from 100 to 350 ml/100 g, preferably from 250 to 350 ml/100 g.

The particles are secured to the surface. The securing process may take place in a manner known to the skilled worker, chemically or physically (mechanically). The self-cleaning surface can be generated by applying the particles to the surface in a tightly packed layer.

The self-cleaning surfaces of the invention preferably have a roll-off angle of less than 20°, particularly preferably less than 10°, the roll-off angle being defined as that angle at which a water droplet rolls off when applied from a height of 1 cm to a flat surface resting on an inclined plane. The advancing angle and the receding angle are preferably greater than 140°, particularly preferably greater than 150°, and have less than 15° of hysteresis, preferably less than 100. Particularly good self-cleaning surfaces are accessible by virtue of the fact that the surfaces of the invention have an advancing and receding angle greater than at least 140°, preferably greater than 150°.

Depending on the surface used and on the size and material of the particles used, semitransparent self-cleaning surfaces may be obtained. In particular, the surfaces of the invention may be contact-transparent, i.e. when a surface of the invention is produced on an object on which there is writing, this writing remains legible if its size is adequate.

The self-cleaning surfaces of the invention are preferably produced by the process as described above. This process of the invention for producing self-cleaning surfaces by securing particles to the surface to create a suitable, at least partially hydrophobic, surface structure is distinguished by the use of particles as described above, which have fissured structures with elevations and/or depressions in the nanometer range.

The particles used are preferably those which comprise at least one material selected from the group consisting of silicates and doped silicates, minerals, metal oxides, fumed silicas or precipitated silicas, and polymers. The particles very particularly preferably comprise silicates, fumed silicas, or precipitated silicas, in particular Aerosils, minerals, such as magadiite, $Al_2O_3$, $SiO_2$, $TiO_2$, $ZrO_2$, Zn powder coated with Aerosil R974, or pulverulent polymers, e.g. cryogenically milled or spray-dried polytetrafluoroethylene (PTFE).

Particular preference is given to the use of particles with a BET surface area of from 50 to 600 $m^2/g$. Very particular preference is given to the use of particles which have a BET surface area of from 50 to 200 $m^2/g$.

The particles for generating the self-cleaning surfaces preferably have hydrophobic properties, besides the fissured structures. The particles may themselves be hydrophobic, e.g. particles comprising PTFE, or the particles used may have been hydrophobicized. The hydrophobicization of the particles may take place in a manner known to the skilled worker. Examples of typical hydrophobicized particles are very fine powders, such as Aerosil R974 or Aerosil R8200 (Degussa A G), these materials being commercially available.

The process of securing the particles to the surface may take place in a manner known to the skilled worker, chemically or physically. An example of a chemical securing method is the use of a fixative. Fixatives which may be used are various adhesives, adhesion promoters, or coatings. The skilled worker will be able to find other fixatives or chemical securing methods.

An example of a physical method is pressure-application of the particles or pressing of the particles into the surface. The skilled worker will readily be able to find other suitable physical methods for securing particles to the surface, for example the sintering of particles to one another or the sintering of the particles to a fine-powder carrier material.

In carrying out the process of the invention it can be advantageous to use particles which have hydrophobic properties and/or which have hydrophobic properties by virtue of treatment with at least one compound selected from the group consisting of the alkylsilanes, alkyldisilazanes, parafins, waxes, fluoroalkylsilanes, fatty esters, functionalized long-chain alkane derivatives, and perfluoroalkylsilanes. The hydrophobicization of particles is well known, as described in the Degussa A G series of publications Pigmente [Pigments], number 18.

It can also be advantageous for the particles to be given hydrophobic properties after the process of securing to the carrier. One way in which this can be carried out is for the particles of the treated surface to be given hydrophobic properties by virtue of treatment with at least one compound selected from the group consisting of the alkylsilanes, which can be purchased from Sivento GmbH, for example, alkyldisilazanes, paraffins, waxes, fluoroalkylsilanes, fatty esters, functionalized long-chain alkane derivatives, and perfluoroalkylsilanes. The method of treatment is preferably that the surface which comprises particles and which is to be hydrophobicized is dipped into a solution which comprises a hydrophobicizing reagent, e.g. alkylsilanes, excess hydrophobicizing reagent is allowed to drip off, and the surface is annealed at the highest possible temperature. However, another way of carrying out the treatment is to spray the self-cleaning surface with a medium comprising a hydrophobicizing reagent, and then anneal. Treatment of this type is preferred, for example, for treating steel carriers or other heavy or bulky objects. The maximum temperature which may be used is limited by the softening point of carrier or substrate.

Both in the hydrophobicization process and during the process of securing the particles to the surface, care has to be taken that the fissured structure of the particles in the nanometer range is retained, in order that the self-cleaning effect is achieved on the surface.

The process of the invention gives excellent results in the production of self-cleaning surfaces on planar or non-planar objects, in particular on nonplanar objects. This is possible only to a limited extent with the conventional processes. In particular, processes in which prefabricated films are applied to a surface and processes in which the intention is to produce a structure by embossing are not capable, or have only very limited capability, for use on nonplanar objects, e.g. sculptures. However, the process of the invention may, of course, also be used to produce self-cleaning surfaces on objects with planar surfaces, e.g. greenhouses or public conveyances. The use of the process of the invention for producing self-cleaning surfaces on greenhouses has particular advantages, since the process can also produce self-cleaning surfaces on transparent materials, for example, such as glass or Plexiglas®, and the self-cleaning surface can be made transparent at least to the extent that the amount of sunlight which can penetrate the transparent surface equipped with a self-cleaning surface is sufficient for the growth of the plants in the greenhouse. Greenhouses which have a surface of the invention can be operated with intervals between cleaning which are longer than for conventional greenhouses, which have to be cleaned regularly to remove, inter alia, leaves, dust, lime, and biological material, e.g. algae.

In addition, the process of the invention can be used for producing self-cleaning surfaces on non-rigid surfaces of objects, e.g. umbrellas or other surfaces required to be flexible. The process of the invention may very particularly preferably be used for producing self-cleaning surfaces on flexible or inflexible partitions in the sanitary sector, examples of partitions of this type are partitions dividing public toilets, partitions of shower cubicles, of swimming pools, or of saunas, and also shower curtains (flexible partition).

The present invention also provides particles which have a fissured structure with elevations and/or depressions in the nanometer range, and which are suitable for producing surfaces of the present invention. These particles preferably have elevations and/or depressions with an average height of from 20 to 500 nm, preferably from 20 to 200 nm. The distance between the elevations and/or depressions on the particle is preferably below 500 nm, with preference below 200 nm. The particles of the invention may, for example, have been selected from at least one material selected from the group consisting of silicates, doped silicates, minerals, metal oxides, fumed or precipitated silicas, polymers, and metal powders.

The particles may be particles in the sense of DIN 53 206. Particles in accordance with this standard may be individual particles or else aggregates or agglomerates, where according to DIN 53 206 aggregates are primary particles in edge- or surface-contact, while agglomerates are primary particles in point-contact. The particles used may also be those formed when primary particles combine to give agglomerates or aggregates. The structure of particles of this type may be spherical, strictly spherical, moderately aggregated, approximately spherical, extremely highly agglomerated, or porous-agglomerated. The preferred size of the agglomerates or aggregates is from 20 nm to 100 μm, particularly preferably from 0.2 to 30 μm.

The examples below are intended to provide further description of the surfaces of the invention and the process for producing the surfaces, without limiting the invention to these embodiments.

EXAMPLES

Example 1

20% by weight of methyl methacrylate, 20% by weight of pentaerythritol tetraacrylate, and 60% by weight of hexanediol dimethacrylate were mixed together. Based on this mixture, 14% by weight of Plex 4092 F, an acrylic copolymer from Rohm GmbH and 2% by weight of UV curing agent Darokur 1173 were added, and the mixture was stirred for at least 60 min. This mixture was applied as carrier, at a thickness of 50 μm, to a PMMA sheet of thickness 2 mm. The layer was dried for 5 min. The particles then applied by spraying, by means of an electrostatic spray gun, were the hydrophobicized fumed silica Aerosil VPR411 (Degussa A G). After 3 min, the carrier was cured under nitrogen at a wavelength of 308 nm. Once the carrier had cured, excess Aerosil VPR411 was removed by brushing. The surface was first characterized visually, and recorded as +++, meaning that there is virtually complete development of water droplets. The roll-off angle was 2.4°. The advancing and receding angle were each measured as greater than 150°. The associated hysteresis was below 10°.

Example 2

The experiment of Example 1 was repeated, but particles of aluminum oxide C (Degussa A G), an aluminum oxide with a BET surface area of 100 $m^2/g$, were spray-applied electrostatically. Once the curing of the carrier was complete, as in Example 1, and excess particles had been removed by brushing, the cured, brushed sheet was dipped into a formulation of tridecafluorooctyltriethoxysilane in ethanol (Dynasilan 8262, Sivento GmbH) for hydrophobicization. Once excess Dynasilan 8262 had dripped off, the sheet was annealed at a temperature of 80° C. The surface is classified as ++, i.e. the completeness of water droplet formation is not ideal, and the roll-off angle is below 20°. FIG. 1 shows an SEM of the aluminum oxide aluminum oxide C.

Example 3

Figure 2:
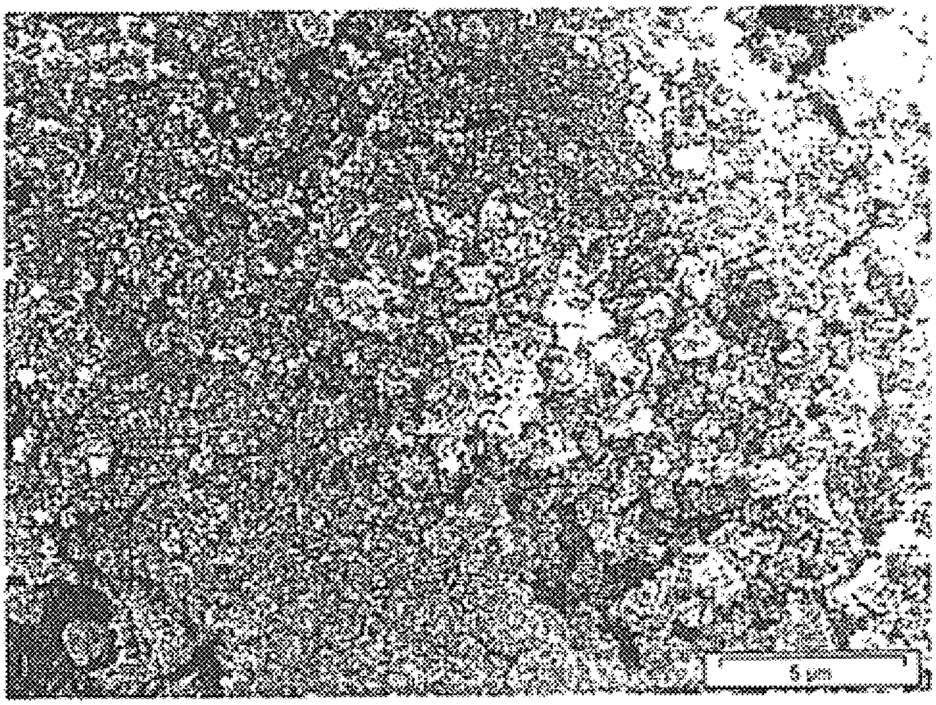

Sipernat 350 silica from Degussa A G is scattered over the sheet of Example 1, treated with the carrier. After 5 min of permeation time, the treated sheet is cured under nitrogen in UV light at 308 nm. Again, excess particles are removed by brushing, and the sheet is in turn dipped into Dynasilan 8262 and then annealed at 80° C. The surface is classified as +++. FIG. 2 shows a SEM of the surface of particles of the silica Sipernat FK 350 on a carrier.

Example 4

The experiment of Example 1 is repeated, but Aerosil R8200 (Degussa A G), which has a BET surface area of 200±25 $m^2/g$, is used instead of Aerosil VPR411. The assessment of the surface is +++. The roll-off angle was determined as 1.3°. The advancing and receding angle were also measured, and each was greater than 150°. The associated hysteresis is below 10°.

Example 5

10% by weight (based on the total weight of the coating mixture) of 2-(N-ethylperfluorooctanesulfonamido)ethyl acrylate were also added to the coating of Example 1, which had previously been mixed with the UV-curing agent. This mixture, too, was in turn stirred for at least 60 min. This mixture was applied as carrier, at a thickness of 50 μm, to a PMMA sheet of thickness 2 mm. The layer was dried for 5 min. The particles then applied by spraying, by means of an electrostatic spray gun, were the hydrophobicized fumed silica Aerosil VPR411 (Degussa A G). After 3 min, the carrier was cured under nitrogen at a wavelength of 308 nm. Once the carrier had cured, excess Aerosil VPR411 was removed by brushing. The surface was first characterized visually, and recorded as +++, meaning that there is virtually complete development of water droplets. The roll-off angle was 0.5°. The advancing and receding angle were each measured as greater than 150°. The associated hysteresis was below 10°.

The disclosure of German priority patent application 10118345.3, filed Apr. 12, 2001, is hereby incorporated by reference.

What is claimed is:

1. A self-cleaning surface which has an at least partially hydrophobic, surface structure comprising elevations and depressions, where the elevations and depressions are formed by particles secured to the surface, wherein the particles have a fissured structure with elevations and/or depressions wherein the average height of the elevations and/or depressions of the particles is from 20 to 500 nm, and wherein the distance between the elevations and/or depressions of the particles is below 500 nm, and wherein the particles are secured to the surface by a physical method.

2. The self-cleaning surface as claimed in claim 1, wherein the particles have an average size of less than 50 μm.

3. The self-cleaning surface as claimed in claim 2, wherein the particles have an average size of less than 30 μm.

4. The self-cleaning surface as claimed in claim 1, wherein the particles comprise at least one material selected from the group consisting of silicates, doped silicates, minerals, metal oxides, fumed and precipitated silicas, polymers, metal powders and silica coated metal powders.

5. The self-cleaning surface as claimed in claim 1, wherein the particles have hydrophobic properties.

6. The self-cleaning surface as claimed in claim 1, wherein individual particles are separated from each other on the surface by from 0 to 10 particle diameters.

7. The self-cleaning polymer surface as claimed in claim 1, wherein individual particles are separated from each other on the surface by from 2 to 3 particle diameters.

8. The self-cleaning surface as claimed in claim 1, wherein the average height of the elevations and/or depressions of the particles is from 20 to 200 nm.

9. The self-cleaning surface as claimed in claim 1, wherein the distance between the elevations and/or depressions of the particles is below 200 nm.

10. A process for producing self-cleaning surfaces having an at least partially hydrophobic, surface structure, which comprises securing particles which have fissured structures with elevations and/or depressions on a surface by a physical method, wherein the average height of the elevations and/or depressions of the particles is from 20 to 500 nm, and wherein the distance between the elevations and/or depressions of the particles is below 500 nm.

11. The process as claimed in claim 10, wherein the particles comprise at least one material selected from the group consisting of silicates, doped silicates, minerals, metal oxides, fumed and precipitated silicas, polymers, metal powders and silica coated metal powders.

12. The process as claimed in claim 10, wherein the physical method comprises pressing the particles into the surface, or by sintering the particles to one another or sintering particles to a fine-powder carrier material.

13. The process as claimed in claim 10, wherein the particles have hydrophobic properties.

14. The process as claimed in claim 13, wherein the hydrophobic properties have been obtained by treatment of the particles with at least one compound selected from the group consisting of alkylsilanes, fluoroalkyl-silanes, paraffins, waxes, fatty esters, functionalized long-chain alkane derivatives, disilazanes, alkyldisilazanes, and fluoroalkane derivatives.

15. The process as claimed in claim 13, wherein the hydrophobic properties are imparted to the particles after securing the particles to the surface.

16. The process as claimed in claim 15, wherein the hydrophobic properties have been imparted by treatment of the particles with at least one compound selected from the group consisting of alkylsilanes, fluoroalkyl-silanes, paraffins, waxes, fatty esters, functionalized long-chain alkane derivatives, disilazanes, alkyldisilazanes, and fluoroalkane derivatives.

17. The process as claimed in claim 10, wherein the self-cleaning surfaces are on planar or non-planar objects.

18. The process as claimed in claim 10, wherein the self-cleaning surfaces comprise non-rigid surfaces of objects.

19. The self-cleaning surface of claim 1, wherein the physical method comprises pressing the particles into the surface, or by sintering the particles to one another or sintering particles to a fine-powder carrier material.

* * * * *